United States Patent
Fiwek et al.

(10) Patent No.: US 9,701,285 B2
(45) Date of Patent: Jul. 11, 2017

(54) LOCKING STABILIZER JACK

(71) Applicant: LIPPERT COMPONENTS, INC., Elkhart, IN (US)

(72) Inventors: Michael J. Fiwek, Plymouth, IN (US); Jeffrey K. Albrecht, Goshen, IN (US); Christopher S. Greer, Syracuse, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 0 days.

(21) Appl. No.: 15/010,844

(22) Filed: Jan. 29, 2016

(65) Prior Publication Data

US 2016/0221545 A1    Aug. 4, 2016

Related U.S. Application Data

(60) Provisional application No. 62/109,139, filed on Jan. 29, 2015.

(51) Int. Cl.
*B60S 9/06*    (2006.01)

(52) U.S. Cl.
CPC .................................... *B60S 9/06* (2013.01)

(58) Field of Classification Search
CPC ...... B60S 9/00; B60S 9/02; B60S 9/04; B60S 9/06; B60D 1/66; B66F 3/12
See application file for complete search history.

(56) References Cited

U.S. PATENT DOCUMENTS

| | | | | |
|---|---|---|---|---|
| 3,096,065 A * | 7/1963 | Horn | ......................... | B60S 9/08 |
| | | | | 248/354.3 |
| 3,475,008 A * | 10/1969 | Taylor | ....................... | B60S 9/06 |
| | | | | 254/424 |
| 3,801,068 A * | 4/1974 | Kopas | ....................... | B60S 9/00 |
| | | | | 254/419 |
| 4,708,362 A * | 11/1987 | Raetz | ........................ | B60S 9/04 |
| | | | | 280/763.1 |
| 5,205,586 A * | 4/1993 | Tallman | .................... | B60S 9/06 |
| | | | | 254/424 |
| 5,901,980 A * | 5/1999 | Few | .......................... | B60S 9/06 |
| | | | | 254/424 |
| 6,494,487 B1 | 12/2002 | Nebel | | |
| 6,827,335 B1 * | 12/2004 | Medberry | ................. | B60S 9/06 |
| | | | | 254/424 |
| 2015/0034890 A1 * | 2/2015 | Arner | ........................ | B66F 3/12 |
| | | | | 254/133 R |

* cited by examiner

*Primary Examiner* — Brian Swenson
(74) *Attorney, Agent, or Firm* — Barnes & Thornburg LLP

(57) ABSTRACT

A stabilizing jack includes a base frame and a slide frame and a leg connected to the base frame and to the slide frame. The leg may be selectively extended into contact with a mating surface and retracted from the extended position. Locking pins disposed on either of the base frame and the slide frame may selectively engage with pin-receiving apertures on the other of the base frame and the slide frame when the leg is placed in the extended position and disengaged from the apertures when the leg is retracted from the extended position.

20 Claims, 8 Drawing Sheets

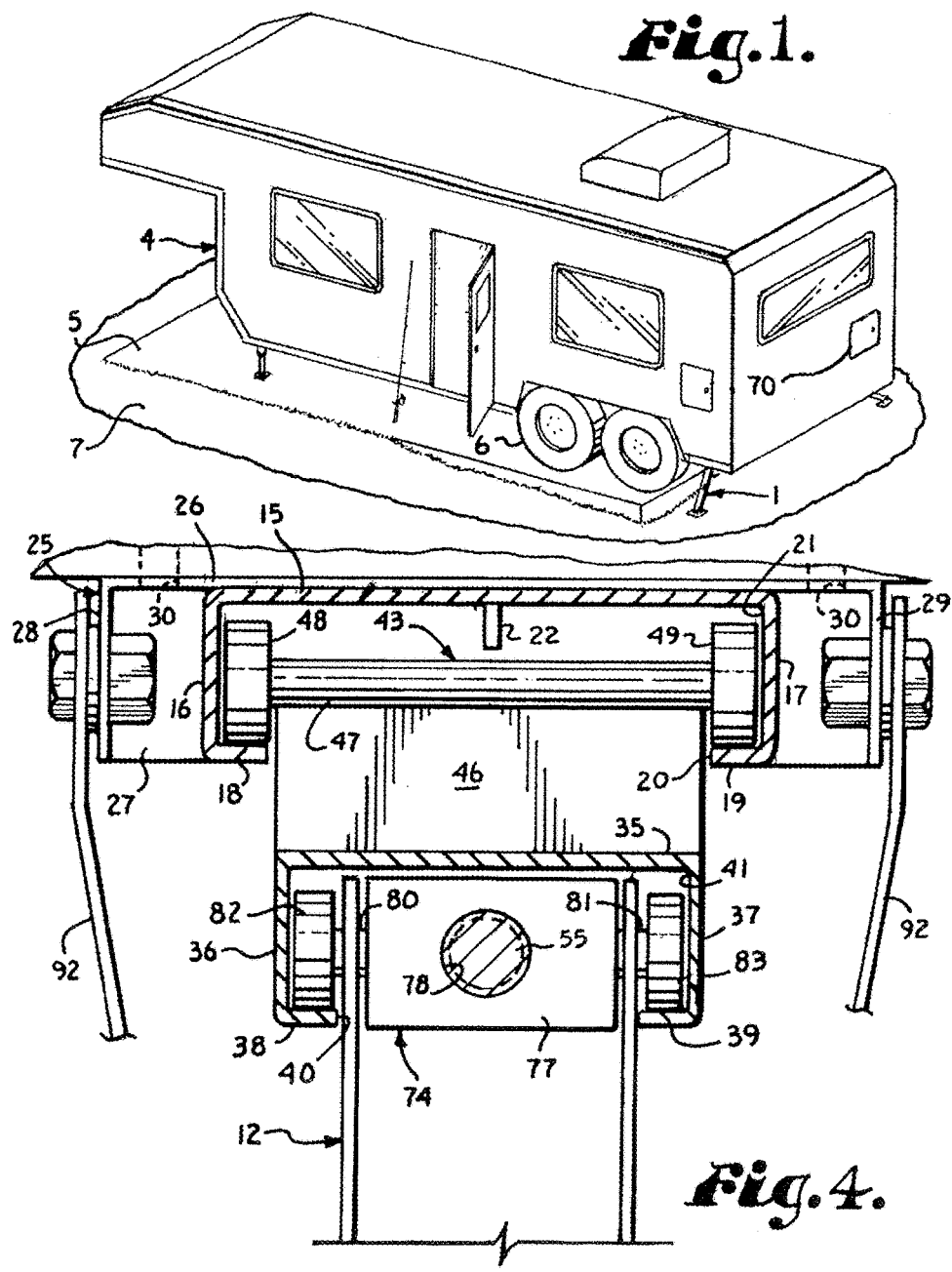

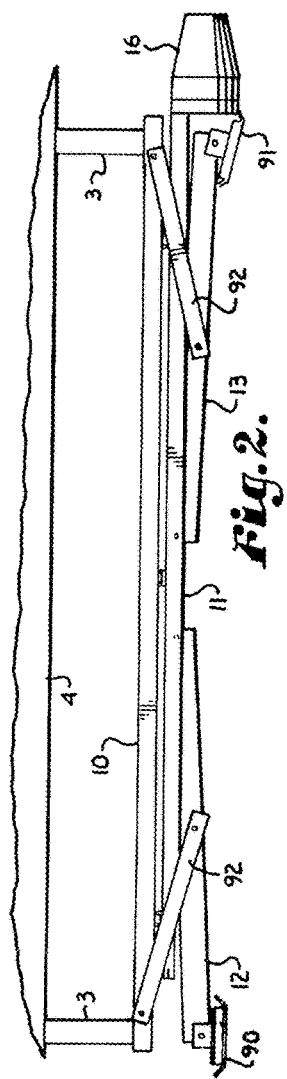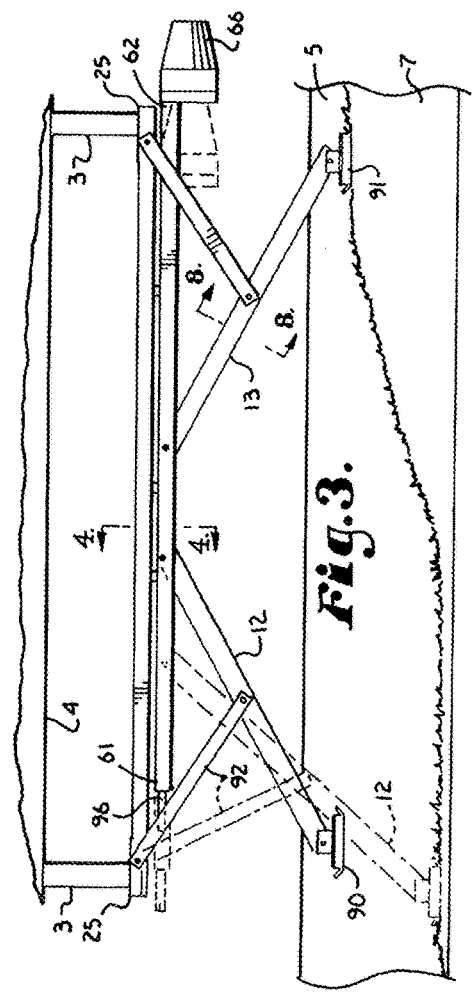

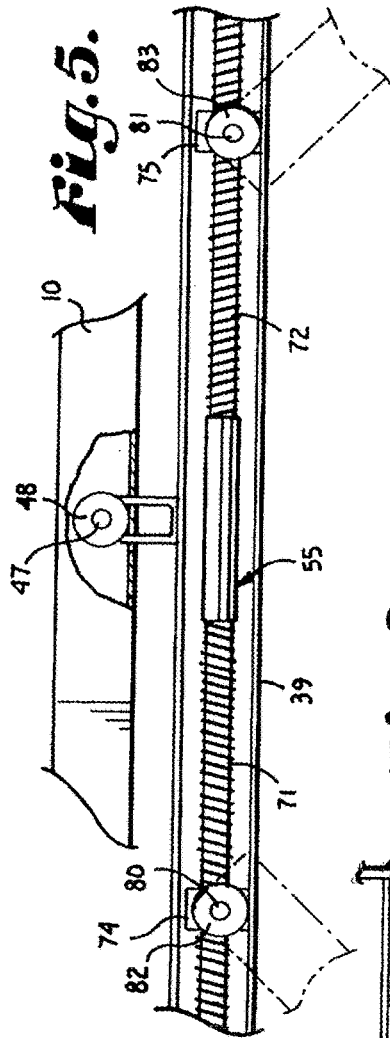
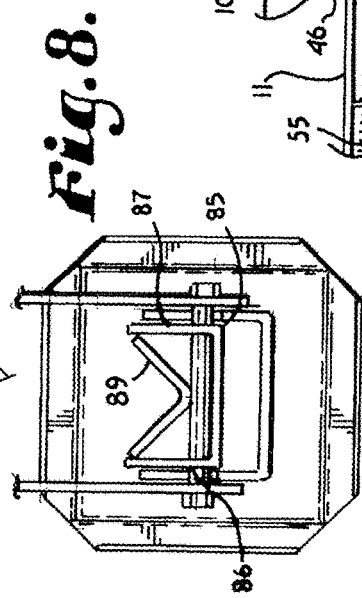
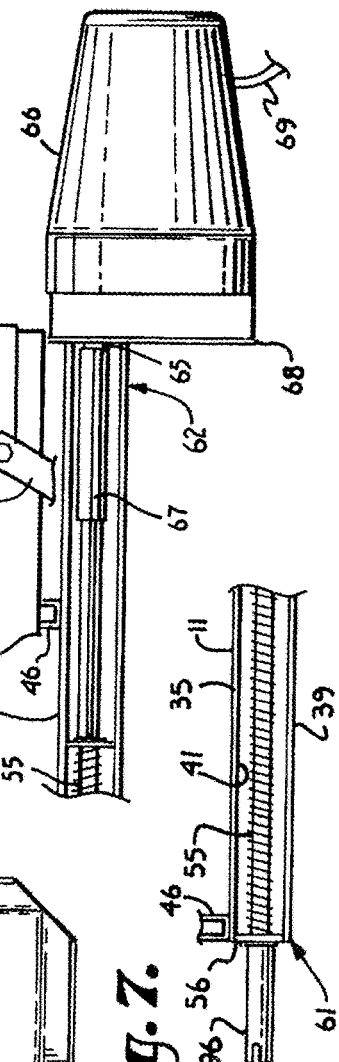

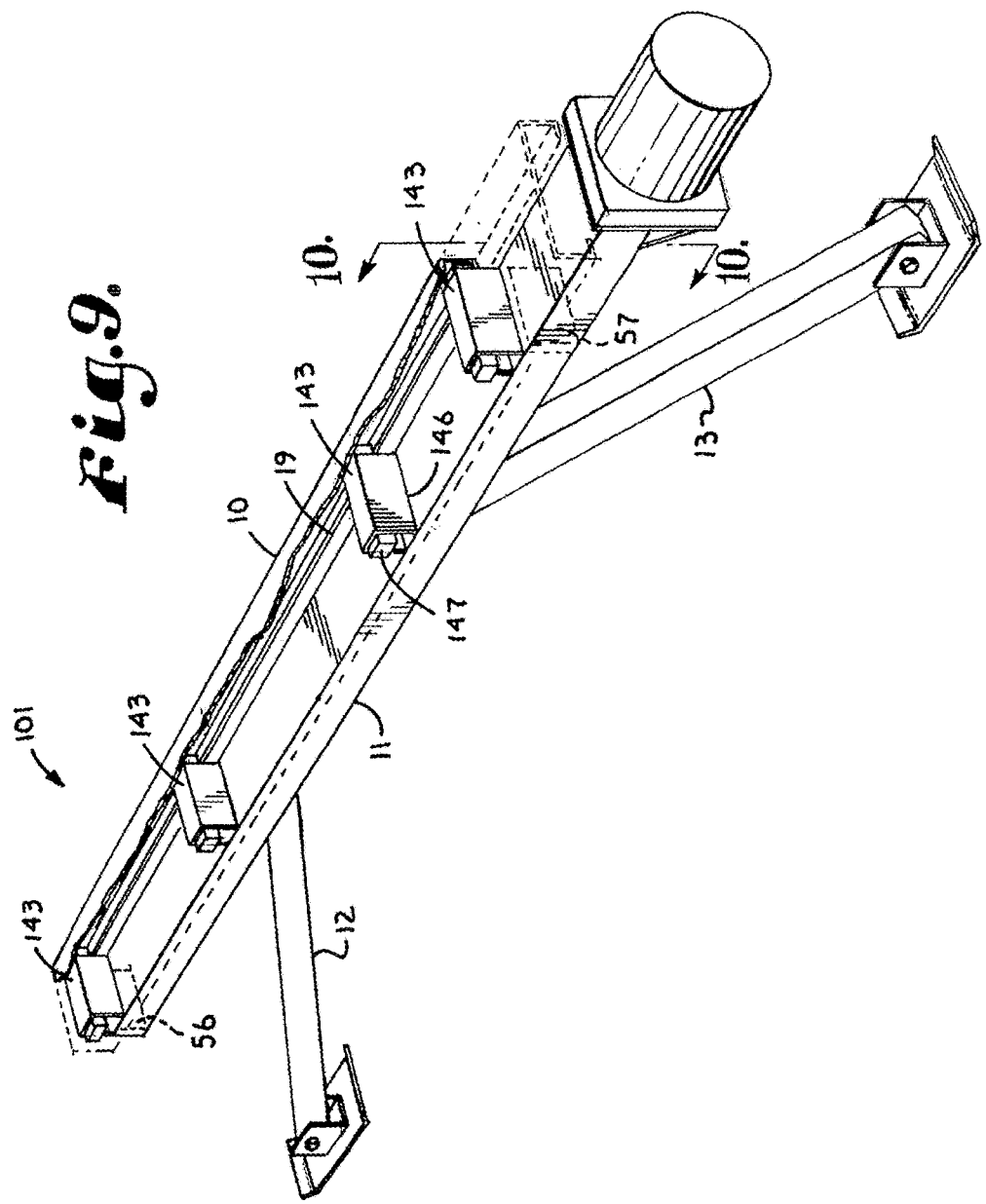

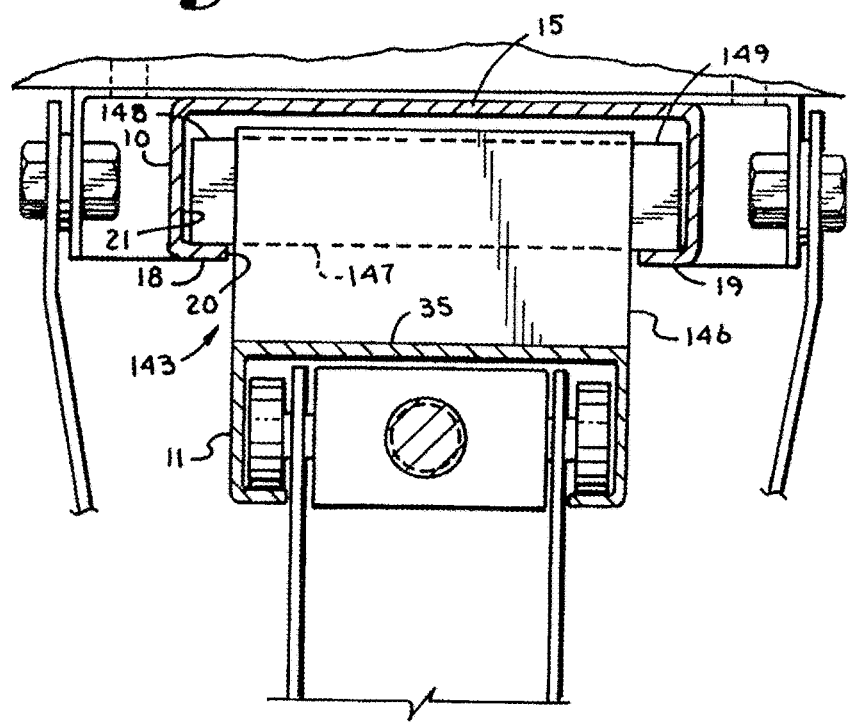
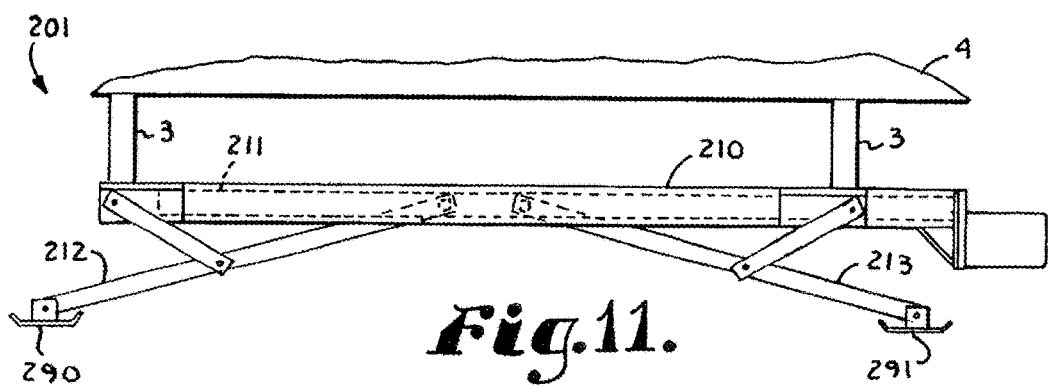

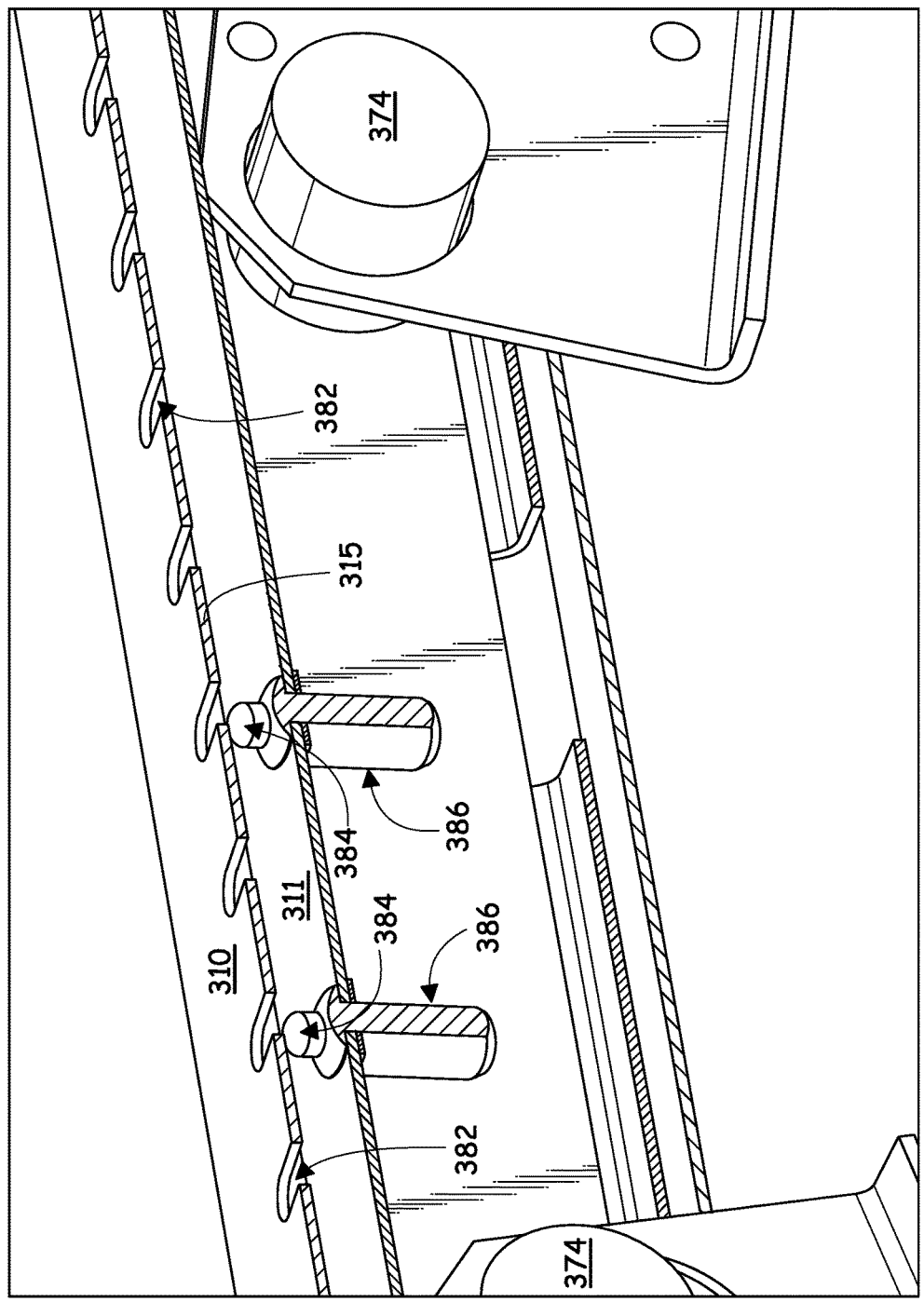

LOCKING STABILIZER JACK

CROSS REFERENCE TO RELATED APPLICATION

This application claims benefit of U.S. Provisional Patent Application No. 62/109,139, filed on Jan. 29, 2015, and incorporates herein by reference the disclosure thereof in its entireties.

BACKGROUND AND SUMMARY OF THE DISCLOSURE

The disclosure relates to stabilizing jacks for recreational vehicles adapted to raise the recreational vehicle relative to its suspension to provide stability to the vehicle when parked. More specifically, the disclosure relates to stabilizing jacks having a locking feature to mitigate or preclude side-to-side sway of a vehicle supported or stabilized by the jack.

The present disclosure shows and describes embodiments of an illustrative stabilizing jack for vehicles having a pair of jack legs advanceable between retracted and extended or raised and lowered positions by a single drive assembly, wherein the drive assembly is mounted on a slide frame which is slidably mounted to a base frame. The base frame is securable to the frame of a vehicle, for example, a recreational vehicle, to stabilize the vehicle when parked.

When the legs are lowered on uneven ground, one leg will engage the ground before the other preventing that leg from further downward advancement but causing the drive assembly to drive the slide frame in an opposite direction while the other leg continues to advance downward until it engages the ground. Once both legs engage the ground, the balanced forces acting through the legs prevent the slide frame from sliding relative to the base frame such that the legs push downward on the ground with equal pressure, pushing upward on the slide frame and base frame and raising the vehicle.

In an embodiment, the drive assembly comprises a drive screw having adjacent left and right hand threaded sections with a screw follower or trunnion secured to each threaded section. Each leg is pivotally secured at a first end thereof to one of the screw followers. Struts or leg braces are pivotally connected at one end to each leg, medially thereof, and are pivotally connected at opposite ends to the base frame at the ends closest the respective leg.

When the screw followers are positioned centrally relative to the drive screw or in close proximity to the transition between the left and right hand threaded sections, the legs are positioned in a retracted position relative to the slide frame and base frame. When the screw is rotated in a first direction, the screw followers advance outward relative to the screw, causing the legs to pivot downward or toward an extended position. When the screw is rotated in an opposite direction, the screw followers advance inward relative to the screw, causing the legs to pivot upward or toward the retracted position.

As the screw is rotated in the first direction and one leg engages the ground before the other, the engagement of that leg against the ground resists outward advancement of the screw follower attached to the leg at its upper end thereof relative to the ground, such that the screw and the slide frame advance in the opposite direction relative to the ground until the other leg touches the ground. Once both legs touch the ground, the equal and opposite forces acting on the slide frame tend to raise it with respect to the base frame. As the slide frame is raised with respect to the base frame, pins located in the slide frame engage with slots located in the base frame to substantially preclude sliding of the slide frame with respect to the base frame. As the slide frame is further raised, it engages with the base frame, causing the base frame to push upward on the vehicle raising it relative to its suspension system.

The drive screw may be driven by a motor connected to the drive screw at one end thereof. The motor may be adapted to automatically shut off when the load thereon exceeds a selected amount, which may occur when the vehicle is raised sufficiently to stabilize the vehicle.

BRIEF DESCRIPTION OF THE DRAWINGS

FIG. 1 is a perspective view of a recreational vehicle parked on a relatively level pad and having a stabilizing jack secured to a rear end thereof and deployed on uneven ground and supporting a rear end of the recreational vehicle;

FIG. 2 is an enlarged and fragmentary, rear elevational view showing a first embodiment of a stabilizing jack according to the present disclosure secured to frame members of the recreational vehicle with the stabilizing jack in a fully retracted position;

FIG. 3 is a view similar to FIG. 2 on a reduced scale and showing the stabilizing jack advancing to an extended position on uneven terrain;

FIG. 4 is an enlarged and fragmentary cross-sectional view taken along line 4-4 of FIG. 3;

FIG. 5 is an enlarged and fragmentary rear elevational view of the stabilizing jack as generally shown in FIG. 3 with portions broken away to show interior detail;

FIG. 6 is an enlarged and fragmentary rear elevational view of the right side of the stabilizing jack as generally shown in FIG. 3 with portions broken away to show interior detail;

FIG. 7 is an enlarged and fragmentary rear elevational view of the left side of the stabilizing jack as generally shown in FIG. 3 with portions broken away to show interior detail;

FIG. 8 is an enlarged and fragmentary cross-sectional view taken generally along line 8-8 of FIG. 3;

FIG. 9 is a fragmentary prospective view of a second embodiment of a stabilizing jack according to the present disclosure;

FIG. 10 is an enlarged and fragmentary cross-sectional view taken along line 10-10 of FIG. 9;

FIG. 11 is a rear elevational view showing a third embodiment of the stabilizing jack of the present invention secured to frame members of the recreational vehicle with the stabilizing jack in a nearly retracted position;

FIG. 15 is a fragmentary perspective view of a portion of the stabilizer jack of FIG. 14.

DETAILED DESCRIPTION OF THE INVENTION

Figure 12:
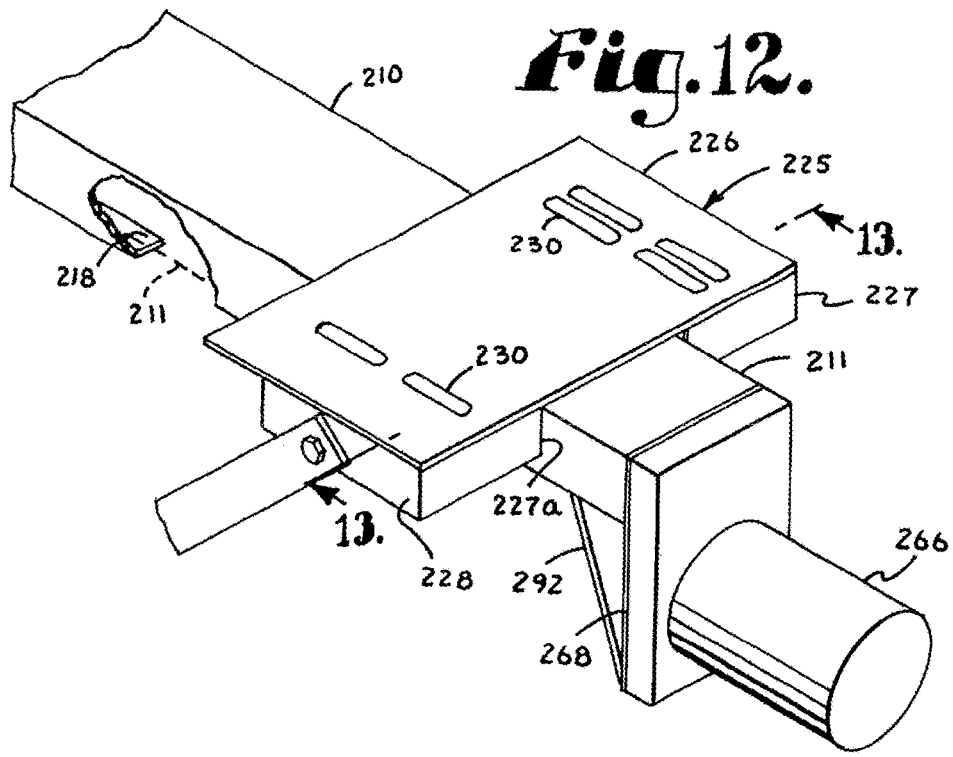
FIG. 12 is an enlarged and fragmentary perspective view of a third embodiment of a stabilizing jack according to the present disclosure.

Referring to the drawings in more detail, and in particular FIGS. 1-3, the reference numeral 1 refers to a stabilizing jack shown secured to frame members 3 of a recreational vehicle 4 parked on a pad 5. The recreational vehicle 4 is supported on a spring suspension system not shown connected to wheels 6. The suspension system is adapted to provide a smooth ride during travel. However, when the recreational vehicle 4 is parked, the suspension system allows the vehicle 4 to rock back and forth and bounce up and down relative to the wheels 6 as a passenger moves around in the vehicle 4.

The stabilizing jack 1 is adapted for raising the vehicle 4 upward relative to the wheels 6 to take some of the weight of the vehicle off of the suspension system to stabilize the vehicle 4 and prevent rocking and bouncing of the parked vehicle 4. For fifth wheel type recreational vehicles 4, as shown in FIG. 1, one stabilizing jack 1 is mounted across the rear end of the vehicle 4. In motor coach type recreational vehicles with an integral cab (not shown), a second stabilizing jack 1 is mounted across the front end of the vehicle 4. The stabilizing jack is not intended for use in leveling the recreational vehicle 4. The vehicle 4 is preferably parked on level ground such as a level pad 5 prior to stabilization. However, as shown in FIGS. 1 and 3, the ground 7 around the pad 5 on which the stabilizer jack 1 is to be supported, may not be level.

First Embodiment

Referring to FIGS. 2-4, in a first embodiment, the stabilizing jack 1 comprises a channel-type mounting frame, base frame or member 10, a channel-type slide frame or member 11 slidably secured to and below the mounting frame 10, and first and second legs 12 and 13 connected to the slide frame 11 and advanceable between a retracted and extended orientation or a raised and lowered orientation relative thereto. As best seen in FIG. 4, the mounting frame 10 is formed from an elongated downwardly opening C-channel comprising a web 15, downwardly extending sidewalls 16 and 17, and inwardly extending track flanges 18 and 19 with a guide slot 20 extending therebetween and opening to an interior space or channel 21. A rib 22 is welded to and extends downward from the web 15 of mounting frame 10 into the channel 21.

A mounting bracket 25 is secured to each end of the mounting frame 10 for use in bolting the mounting frame 10 to the frame members 3 of the recreational vehicle 4. The mounting bracket 25 includes a top plate 26, downwardly extending end flange 27, and downwardly extending side flanges 28 and 29. The top plate 26 is wider than the web 15 of mounting frame 10. The mounting brackets 25 are welded to the mounting frame 10 on opposite ends thereof, such that the top plate 26 rests against the web 15 and the downwardly extending end flange 27 of each mounting bracket 25 abuts against a respective end of the mounting frame 10. Bolt holes 30 extend through the top plate 26 of each mounting bracket 25 on opposite sides of the mounting frame web 15. Corresponding holes are drilled into the frame members 3 of the recreational vehicle 4 to permit the stabilizing jack 1 to be bolted thereto.

The slide frame 11 is also formed from an elongated downwardly opening C-channel member comprising a web 35, downwardly extending sidewalls 36 and 37, and inwardly extending track flanges 38 and 39 with a guide slot 40 extending therebetween opening to an interior space or channel 41. In the embodiment shown, the slide frame 11 is narrower than the mounting frame 12 with the width of the slide frame 11 generally corresponding to the width of the mounting frame guide slot 20. It is foreseeable that the relative widths of the mounting frame 10 and slide frame 11 could be varied.

The slide frame 11 is slidably connected to the mounting frame 10 by three roller assemblies 43. Each roller assembly 43 comprises a base 46 formed from a length of square tubing welded to the upper surface of the web 35 of slide frame 11. An axle 47 is welded lengthwise to an upper surface of the base 46 and rollers 48 and 49 are rotatably mounted on opposite ends of the axle 47 beyond the ends of the base 46. The spacing of the rollers 48 and 49 corresponds to the spacing of the mounting frame track flanges 18 and 19 and the bases 46 of the roller assemblies 43 are narrower than the mounting frame guide slot 20. The axles 47 of roller assemblies 43 extend in closely spaced relation below the rib 22.

The slide frame 11 is slidably secured to the mounting frame 10 by sliding or rolling the rollers 48 and 49 onto the mounting frame track flanges 18 and 19 from one end of the mounting frame 10, through a notch, not shown, in the mounting bracket end flange 27, such that the bases 46 extend through the guide slot 20 and the slide frame 11 is supported below the mounting frame 10 with the rollers 48 and 49 supported on the mounting frame track flanges 18 and 19.

As best seen in FIGS. 5-7, a drive screw 55 is rotatably mounted lengthwise within the slide frame 11 on first and second bearing plates 56 and 57. Referring to FIGS. 6 and 7, the first bearing plate 56 extends across the channel 41 of slide frame 11 at a first end 61 thereof. The second bearing plate 57 extends across the channel 41 of slide frame 11 in inwardly spaced relation from a second end 62 of the slide frame 11. The drive screw 55 is connected to and driven by a drive shaft 65 of motor 66 by linkage 67. The motor 66 is mounted on motor mounting plate 68 which is welded to the second end 62 of slide frame 11.

The motor 66 and the motor mounting plate 68 are mounted relative to the slide frame 11 such that the motor 66 extends completely below the mounting frame 10 such that the motor 66 may slide beneath the mounting frame 10 as the slide frame 11 slides relative to the mounting frame 10. The motor 66 is electrically connected by cord 69 to a battery and a switching system which permits reversible rotation of the drive screw 55. The switching system may be located in a wide variety of positions and is preferably located behind an access panel, such as access panel 70, on the outside of the vehicle 4 close to the stabilizer jack 1 to facilitate viewing of the stabilizing jack 1 when the first and second legs 12 and 13 are being raised and lowered.

The switching system is preferably of the type having a switch lever which is normally biased to an off position and which may be urged to a first switch position or condition generally marked as an extend position, in which a circuit connecting the motor 66 to the battery is closed causing the motor 66 to rotate the drive shaft 65 in a first direction causing the legs 12 and 13 to lower as discussed in more detail below. The switch lever may also be urged to a second switch position or condition generally marked as a retract position, in which the polarity of the connections between the battery and the motor 66 are reversed and closed causing the motor 66 to rotate the drive shaft 65 in an opposite direction causing the legs 12 and 13 to lower as discussed in more detail below.

The drive screw 55 includes a first threaded section 71 and a second threaded section 72 having right and left handed threads respectively. First and second trunnions 74 and 75 are threadingly secured to the first and second threaded sections 71 and 72 respectively of the drive screw 55. As best seen in FIG. 4, each trunnion 74 and 75 includes a base or block 77 with a threaded bore 78 extending therethrough for receiving the first or second threaded sections 71 or 72 of the drive screw 55. First and second axle pins 80 and 81 are press fit into a bore extending through the block 77 transverse to the threaded bore 78. The axle pins 80 and 81 are press fit into opposite sides of the block 77 and have first and second rollers 82 and 83 respectively mounted on outer ends thereof. The first and second rollers 82 and 83 are supported on the slide frame track flanges 38 and 39 respectively.

An upper end 86 of each leg 12 and 13 is pivotally mounted to trunnions 74 and 75 respectively. As best seen in FIG. 8, each leg 12 and 13 is formed from a U-shaped channel member 85 with upstanding sidewalls 86 and 87. The sidewalls 86 and 87 are pivotally supported on the axle pins 80 and 81 respectively which extend through bores in the sidewalls 86 and 87. The sidewalls 86 and 87 are supported on the axle pins 80 and 81 between the block 77 and the rollers 82 and 83 respectively. A reinforcing member 89 comprising a length of angle iron is welded into the U-shaped channel member 85 along approximately the lower two thirds thereof to strengthen the legs 12 and 13.

Feet 90 and 91 are pivotally secured to the distal ends of leg 12 and 13 respectively. A pair of struts or leg braces 92 are pivotally secured at first ends 93 thereof to each leg 12 and 13 generally medially thereof and on opposite sides. Second ends 94 of the struts are pivotally secured to the side flanges 28 and 29 of the mounting bracket 25 positioned closest thereto. Referring to FIG. 8, a manual crank fitting 96 is formed on or secured to the end of the drive screw 55 opposite the motor 66 for engagement by the end of a hand crank (not shown) to permit manual rotation of the drive screw 55 if electrical power is not available.

Operation

Referring to FIG. 2, the stabilizing jack 1 is shown in a fully retracted position, wherein the trunnions 74 and 75 are positioned proximate the center of the drive screw 55 or the transition between the left and right hand threaded sections 71 and 72 of the drive screw 55. In the retracted position, the legs 12 and 13 are generally pivoted upward in closely angled relation to the slide frame 11 due to the restraining nature of the struts 92, and the slide frame 11 is generally centrally supported relative to the mounting frame 10.

To lower the legs 12 and 13, an operator urges the switch lever to the extend position, activating the motor 66 and rotating the drive screw 55 in a first direction causing the first and second trunnions 74 and 75 to move outward, apart from one another along the opposingly threaded first and second threaded sections 71 and 72 of the drive screw 55. Outward advancement of the trunnions 74 and 75 causes the attached legs 12 and 13 respectively to pivot downward relative to slide frame 11 at the same rate with the slide frame 11 generally remaining stationary relative to mounting frame 10. If the foot of one leg, such as foot 91 of leg 13, engages the ground 7 first, due to uneven ground as generally shown in FIG. 3, the contact between the foot 91 and ground 7 generally provides resistance to further pivoting of leg 13 relative to slide frame 11 and therefore resists outward advancement of trunnion 75. Until the other foot, foot 90 of leg 12, engages the ground 7, further rotation of the drive screw 55 in the first direction causes the slide frame 11 to be driven or slide in the opposite direction as the outward path of travel of the trunnion 75. As shown by phantom lines in FIG. 3, the slide frame 11 slides to the left once foot 91 of leg 13 engages the ground 7 and until foot 90 of leg 12 engages the ground. As the slide frame 11 slides to the left, the trunnion 74, connected to leg 12 which has not yet touched the ground 7, continues to travel outward or to the left in FIG. 3, causing leg 12 to continue to pivot downward until the foot 90 on leg 12 touches the ground 7. Once the feet 90 and 91 of both legs 12 and 13 are advanced into contact with the ground 7, the contact between the legs 12 and 13 and the ground 7, generally prevents the slide frame 11 from sliding in either direction.

Continued rotation of the drive screw 55 in the first direction, once both legs 12 and 13 are in contact with the ground, then causes outward advancement of trunnions 74 and 75 causing the legs 12 and 13 to pivot downward at the same rate raising the vehicle 4 upward relative to its suspension system. The motor 66 is of a type which will automatically shut off when the load thereon exceeds a predetermined amount. In an embodiment, the vehicle 4 will be raised approximately ¾ of an inch relative to its suspension system before the load on the motor 66 causes the motor 66 to automatically shut off.

Once both legs 12 and 13 are advanced into contact with the ground 7 and the jack 1 begins lifting upward on the vehicle 4, the blocks 77 of trunnions 74 and 75 will be pushed upward against an upper, inner surface of slide frame 11. The blocks 77 of trunnions 74 and 75 will continue to slide relative to the upper, inner surface of the slide frame 11, but the blocks 77 prevent bending of the drive screw 55 due to the forces acting thereon. Similarly the bases 46 and axles 47 of the roller assemblies 43 will be advanced upward against the rib 22. The frictional forces between the rib 22 and the axles 47 resist sliding of the slide frame 11 relative to the mounting frame 10.

Once the vehicle 4 is raised slightly relative to its suspension and wheels 6, the vehicle is sufficiently stabilized to mitigate or preclude rocking and bouncing as an occupant moves around in the vehicle 4. When the vehicle 4 needs to be moved, the operator urges the switch lever to a retract position which reverses the direction of rotation of the drive screw 55, causing the trunnions 74 and 75 to advance inward toward a center of the screw 55 (or the point of transition between the opposingly threaded sections 71 and 72), causing the legs to pivot upward to the retracted position.

Second Embodiment

A second embodiment of a stabilizing jack 101 is substantially similar to the stabilizing jack 1 except that the three roller assemblies 43 which connect the slide frame 11 to the mounting frame 10 are replaced by four glide block assemblies 143 as shown in FIGS. 9 and 10. Each glide block assembly 143 comprises a base 146 formed from a length of rectangular tubing welded transversely to the upper surface of the web 35 of slide frame 11. Each base 146 has a length which is slightly less than the width of the guide slot 20 of the stationary track 10 such that the base 146 can extend upwardly from the slide track 11 through the guide slot 20 and into the channel 21. A glide block 147 having a square cross-section is inserted lengthwise through the tubular base 146 such that opposing end portions 148 and 149 thereof extend outwardly beyond the ends of the base 146 and into sliding engagement with the mounting frame track flanges 18 and 19 (See FIG. 10). The glide blocks 147 have a generally square cross-section and can be composed of square steel tubing (having a relatively smooth finish), blocks of polytetrafluoroethylene (PTFE) or other ultra-high molecular weight (UHMW) plastic, or other suitable materials. The end portions 148 and 149 of the glide blocks 147 slide along the upper surfaces of the respective flanges 18 and 19 to allow relative movement between the slide track 11 and the stationary track 10.

The glide block assemblies 143 are spaced along the slide frame 11 as shown in FIG. 9. A respective one of the glide block assemblies 143 is positioned proximate each of the drive screw bearing plates 56 and 57, with the other two assemblies 143 located intermediately therebetween. The positions of the intermediate assemblies 143 are selected to bear the upward force exerted by the legs 12 and 13 when the stabilizing jack 101 is supporting the vehicle 4. In this load supporting position, the upper surfaces of the glide block bases 146 bear against the lower surface of the web 15 to provide stable support for the vehicle 4.

The stabilizing jack 101 of the second embodiment may be operated in a manner similar to the stabilizing jack 1 first embodiment of the first embodiment.

Third Embodiment

Figure 13:
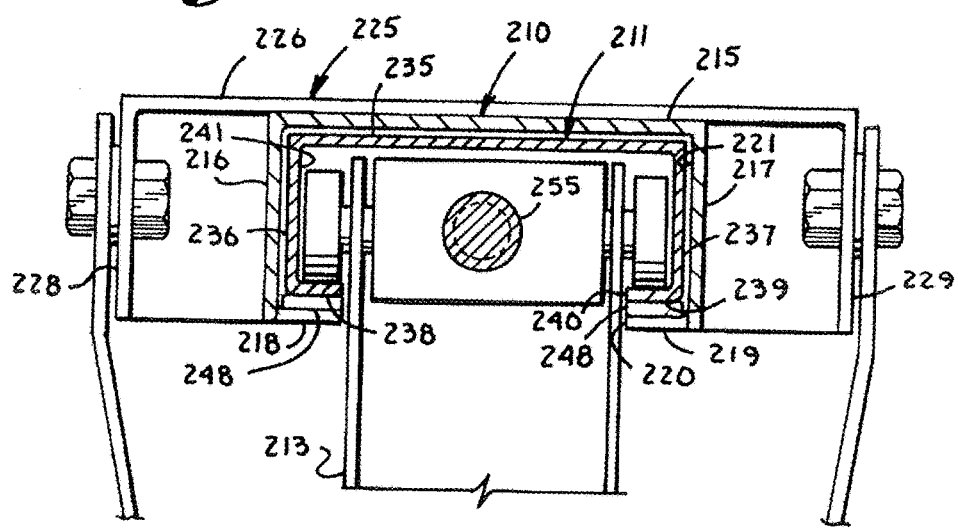
FIG. 13 is an enlarged and fragmentary cross-sectional view taken along line 13-13 of FIG. 12.

A third embodiment of a stabilizing jack 201 is shown in FIGS. 11-13. As is the case with the stabilizing jack 1, the stabilizing jack 201 includes a channel-type stationary base frame or track 210, and a channel-type slide frame or sliding frame member 211 slidably connected to the stationary track 210. However unlike the corresponding parts of the stabilizing jack 1, the slide frame 211 of the stabilizing jack 201 is positioned inside of the stationary track 210 as opposed to being suspended below it. First and second legs 212 and 213 are connected to the slide frame 211 and advanceable between retracted and extended positions relative thereto.

As best seen in FIG. 13, the stationary track 210 is formed from an elongated downwardly opening C-channel comprising a web 215, downwardly extending sidewalls 216 and 217, and inwardly extending track flanges 218 and 219 with a guide slot 220 extending therebetween and opening to an interior space or channel 221. It is foreseen that the track flanges 218 and 219 could be connected directly to a frame member of a recreational vehicle and supported therebelow by sidewalls 216 and 217 without an interconnecting surface or web, the upper surface of the structure being defined by the frame member.

A mounting bracket 225 is secured to each end of the stationary track 210 for use in bolting the stationary track 210 to the frame members 3 of the recreational vehicle 4. The mounting bracket 225 includes a top plate 226, downwardly extending end flange 227, and downwardly extending side flanges 228 and 229. The top plate 226 is wider than the web 215 of stationary track 210. The mounting brackets 225 are welded to the stationary track 210 on opposite ends thereof, such that the top plate 226 rests against the web 215 and the downwardly extending end flange 227 of each mounting bracket 225 abuts against a respective end of the stationary track 210. Each end flange 227 includes a notch or opening 227*a* aligned with the channel 221 of the stationary track 210 through which the slide frame 211 can slide. Bolt holes or slots 230 extend through the top plate 226 of each mounting bracket 225 on opposite sides of the mounting frame web 215. Corresponding holes (not shown) are drilled into the frame members 3 of the recreational vehicle 4 to permit the stabilizing jack 201 to be bolted thereto.

The slide frame 211 is also formed from an elongated downwardly opening C-channel member comprising a web 235, downwardly extending sidewalls 236 and 237, and inwardly extending track flanges 238 and 239 with a guide slot 240 extending therebetween opening to an interior space or channel 241. The web 235 of the slide frame 211 is of a width that is less than the width of the channel 221 of the stationary track 210 but greater than the width of the guide slot 220 of the stationary track 210. The sidewalls 236 and 237 of the slide frame 211 are somewhat shorter than the height of the channel 221 of the stationary track 210.

The slide frame 211 is slidably positioned inside of the channel 221 of the stationary track 210 with the web 235 proximate the web 215 of the stationary track 210. Bearings 248, which may be formed in strips and manufactured of polytetrafluoroethylene (PTFE) or other ultra high molecular weight (UHMW) plastic, are interposed between the flanges 238 and 239 of the slide frame 211 and the respective flanges 218 and 219 of the stationary track 210 to prevent metal-to-metal contact therebetween and promote smooth sliding movement of the slide frame 211 relative to the stationary track 210. The bearings 248 as shown may also be referred to as slide bearings or slider blocks or greaseless bearings 248. Such bearings 248 may be fixedly connected either to the slide frame 211 or to the stationary track 210. Separate bearings 248 could be attached to each set of flanges 238 and 239 and 218 and 219. Various lubricants could be utilized to facilitate sliding of the channel members relative to one another.

The legs 212 and 213 are connected to the stabilizing jack 201 in the same manner as the legs 12 and 13 of the stabilizing jack 1 and include respective feet 290 and 291. The legs 212 and 213 are moved between raised and lowered positions via a drive screw 255 identical to the drive screw 55 of the stabilizing jack 1. The drive screw 255 is driven by a motor 266 which is mounted on a motor mounting plate 268 which is welded to one end of slide frame 211.

As best seen in FIG. 12, with respect to flange 218, the flanges 218 and 219 are removed from or are not formed on a portion of the stationary track 210 proximate the motor mounting plate 268 so that the motor mounting plate 268 and attached motor 266 can pass into the channel 221 as the slide frame 211 slides relative to the mounting frame 210. The motor 266 may be electrically connected to the recreational vehicle 4 in the same manner as the motor 66 of the stabilizing jack 1 described above.

The stabilizing jack 201 further includes a deflector plate 292 which is welded between the motor mounting plate 268 and the flanges 228 and 229 of the slide frame 211 at an angle so as to present an inclined surface to the outboard end of the leg 213 and the attached foot 291 as the leg 213 moves from the raised position to the lowered position. The deflector plate 292 prevents the leg 213 from becoming stuck on the motor mounting plate 268 as it moves into the lowered position by guiding the leg 213 past the plate 268. If the deflector plate 292 were not present, the motor mounting plate 268 could be bent or otherwise damaged by contact with the leg 213. As such, the deflector plate 292 adds an important protective feature to the stabilizing jack 201 and is also recommended for use with the stabilizing jacks 1 and 101.

The stabilizing jack 201 of the third embodiment may be operated in a manner similar to the stabilizing jacks 1, 101 of the first and second embodiments.

Fourth Embodiment

Figure 14:
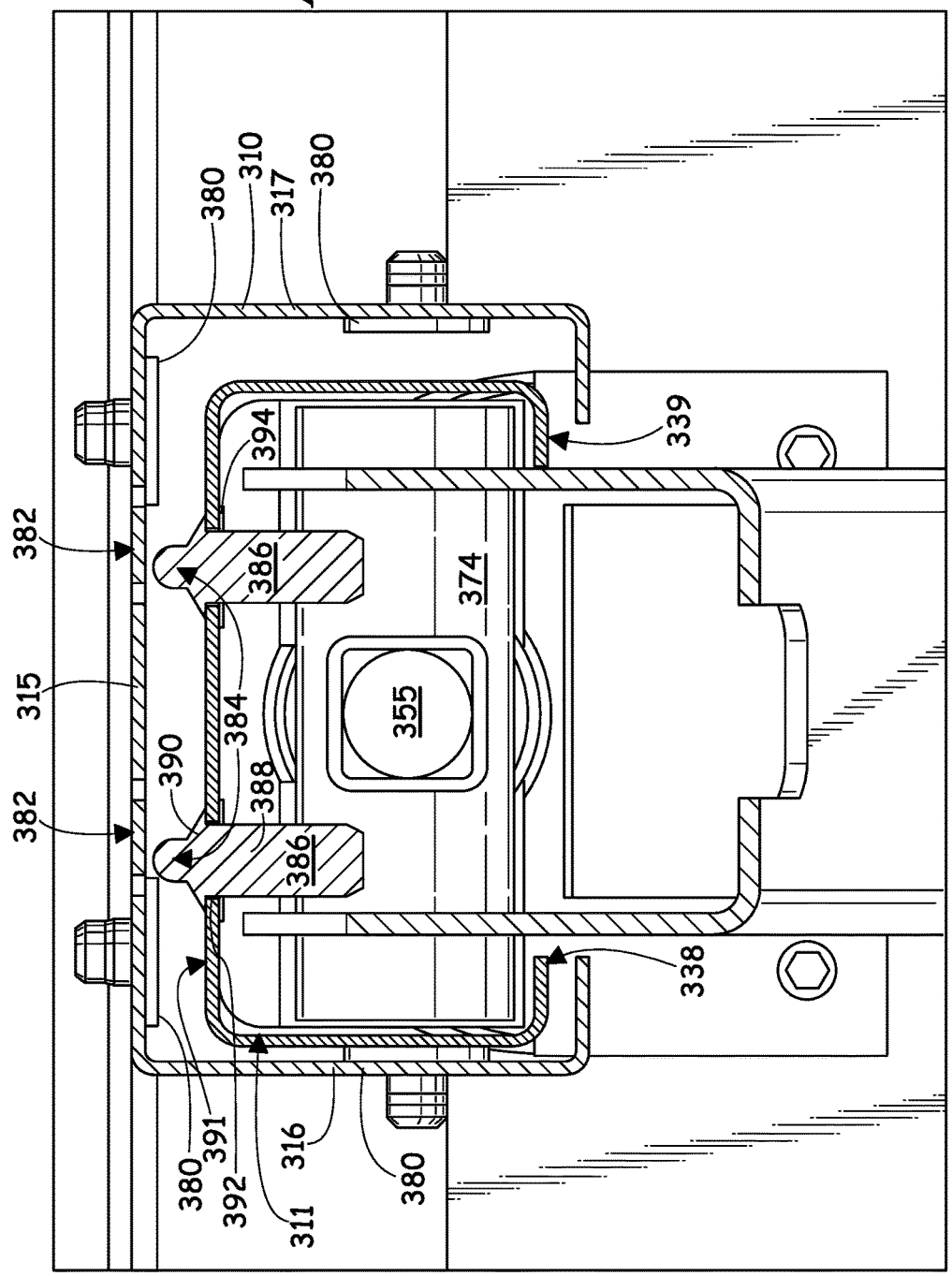
FIG. 14 is an end cross-sectional view of a fourth embodiment of a stabilizer jack according to the present disclosure.

FIGS. 14 and 15 illustrate a fourth embodiment of a stabilizing jack 301 similar to the stabilizing jack 201 of the third embodiment except that the trunnions 374 of the stabilizing jack 301 are not supported by rollers as are the trunnions 274 of the stabilizing jack 201. Instead, the trunnions 374 of the stabilizing jack 301 may ride directly on the track flanges 338, 339 of the slide frame 311. In an embodiment, bearings or glides (not shown) similar to bearings 248 of the third embodiment may be disposed between the trunnions 374 and the slide frame 311, for example, atop the track flanges 338, 339 of the slide frame. In the illustrated embodiment, the trunnions 374 are cylindrical members having a threaded bore formed radially there through. The threaded bore is configured to receive the threads of the drive screw 355.

The stabilizing jack 301 is shown as including wear tabs 380 disposed on inner surfaces of the base frame 310. Two wear tabs 380 are shown as disposed on an inner surface of a cross-section of the web 315 of the base frame 310, and a single wear tab 380 is shown as disposed on an inner surface of cross section of each sidewall 316, 317 of the base frame 310. Further wear tabs 380 could be located at further locations on analogous inner surfaces of the base frame 310. The wear tabs 380 are shown as plugs having a shank and a head. The shank of each wear tab may be inserted through a corresponding aperture in the base frame 310. The wear tabs 380 may preclude direct contact of the web and sidewalls of the slide frame 311 with the web 315 and sidewalls 316, 317 of the base frame 310. The wear tabs 380 may be made of any suitable material, for example, a hard plastic material that may or may not have lubricating qualities, or a metal bearing material.

The stabilizing jack 301 is shown as including a locking mechanism that may preclude side-to-side sway of a vehicle on which the stabilizing jack 301 is installed when the stabilizing jack 301 is deployed. A similar locking mechanism may be included in the stabilizing jacks 1, 101, 201 of any of the first, second and third embodiments, and in other embodiments, as well, including jacks having one or more jack legs each being extendable and retractable by its own drive assembly.

The locking mechanism may be implemented by providing the web 315 of the base frame 310 with a plurality of apertures 382, for example, holes or slots, sized to selectively receive the heads 384 of pins 386 extending from an adjacent face of the slide frame 311. In the illustrated embodiment, each of the pins 386 includes a shank 388 and a circumferential flange 390, with the head 384 extending from the flange 390. The face 391 of the slide frame 311 adjacent the web 315 of the base frame 310 defines a plurality of apertures 388 configured to receive the shanks 388 of the respective pins 386 so that the flange 390 abuts the face 391 of the slide frame. A retaining ring 394 may be received by the shank 388 of the pin 386 and disposed against the face of the slide frame 311 opposite the face 391 of the slide frame, thereby securing the pin 386 to the slide frame. In other embodiments, some or all of the pins 386 could be disposed on the web 315 of the base frame 310, with the heads 384 thereof directed downwardly toward the slide frame 311 and selectively engageable with corresponding apertures in the slide frame.

In operation, the slide frame 311 of the stabilizing jack 301 will rise relative to the base frame 310 once the feet of the jack have contacted the ground underneath the vehicle 4. As the slide frame 311 rises, the heads 384 of the pins 386 may begin to engage with respective ones of the apertures 382 in the web 315 of the base frame 310. As the slide frame 311 continues to rise, the partially engaged heads 384 of the pins 346 will become securely engaged with the respective apertures 382 and will preclude sliding motion of the slide frame 311 with respect to the base frame 310 or limit such sliding motion to the limits of free play between the heads 384 of the pins 386 and the periphery of the respective apertures 382.

The heads 384 of the pins 386 might not initially align with any apertures 382 to readily permit the forgoing engagement when the slide frame 311 initially rises with respect to the base frame 310. Instead, the heads 384 of the pins 386 might engage with an adjacent inner surface of the flange 315 of the base frame 310. A sufficiently substantial side load imparted to the base frame 310, for example, resulting from activity within the vehicle 4, may cause the base frame 310 to slide relative to the slide frame 311 through a distance sufficient to yield alignment of the heads 384 of the pins 386 with respective apertures 382 so that the heads 384 become engaged with the apertures 382, as discussed above, thereby precluding or mitigating further sliding of the slide frame 311 with respect to the base frame 310.

When the jack 301 is initially retracted, the slide frame 311 will lower relative to the base frame 310. Consequently, the pins 386 will become disengaged from the apertures 382 allowing the jack to be returned to its stowed condition.

It is to be understood that while certain forms of stabilizing jacks have been illustrated and described herein, the scope of the appended claims it is not to be limited to the specific forms or arrangement of parts described and shown. For example, without limitation, the track flanges 218 and 219 could be connected directly to a frame member of a recreational vehicle and supported therebelow by sidewalls 216 and 217 without an interconnecting surface or web, the upper surface of the structure being defined by the frame member. Also, the web, the sidewalls or the track flanges of the channel members do not have to be continuous. Further, connections described as bolted generally could instead be welded or otherwise formed and vice versa. Additionally, features disclosed in connection with a given embodiment could be employed in other embodiments to the extent possible.

The invention claimed is:

1. A stabilizing jack comprising:
   a base frame securable to a vehicle;
   a slide frame in translating engagement with the base frame, the slide frame translatable in a first direction with respect to the base frame and the slide frame translatable in a second direction with respect to the base frame;
   a leg having a first end in pivotal and translating engagement with the slide frame and a second end engageable with a mating surface;
   a brace having a first end in pivotal engagement with the base frame and a second end in pivotal engagement with the leg intermediate the first end of the leg and the second end of the leg; and
   a locking pin connected to one of the base frame and the slide frame, the locking pin being selectively engageable and disengageable with a corresponding aperture defined by the other of the base frame and the slide frame in response to translation of the slide frame with respect to the base frame in the second direction.

2. The stabilizing jack of claim 1 further comprising:
   a trunnion connected between the first end of the leg and the slide frame, the trunnion in pivotal engagement with the first end of the leg and the trunnion in sliding engagement with the slide frame.

3. The stabilizing jack of claim 2 further comprising a drive screw having a threaded section, the drive screw in rotational and substantially non-translational engagement with the slide frame and the threaded section in threaded engagement with the trunnion.

4. The stabilizing jack of claim 1 further comprising:
a second leg having a first end in pivotal and translating engagement with the slide frame and a second end engageable with a mating surface; and
a second brace having a first end in pivotal engagement with the base frame and a second end in pivotal engagement with the second leg intermediate the first end of the second leg and the second end of the second leg.

5. The stabilizing jack of claim 4 further comprising a second trunnion connected between the first end of the second leg and the slide frame, the second trunnion in pivotal engagement with the first end of the second leg and the second trunnion in sliding engagement with the slide frame.

6. The stabilizing jack of claim 5, the drive screw further having a second threaded section, the second threaded section in threaded engagement with the second trunnion, one of the threaded section and the second threaded section comprising a right-handed thread and the other of the threaded section and the second threaded section comprising a left-handed thread.

7. The stabilizing jack of claim 6 further comprising a second locking pin connected to one of the base frame and the slide frame, the second locking pin being selectively engageable and disengageable with a corresponding aperture defined by the other of the base frame and the slide frame in response to translation of the slide frame with respect to the base frame in the second direction.

8. The stabilizing jack of claim 7, the locking pin and the second locking pin connected to the same one of the base frame and the slide frame.

9. The stabilizing jack of claim 7, the locking pin and the second locking pin connected to opposite ones of the base frame and the slide frame.

10. The stabilizing jack of claim 6, the locking pin comprising a shank received in a mating aperture defined by the one of the base frame and the slide frame.

11. The stabilizing jack of claim 10 further comprising a retaining ring receiving the shank of the locking pin.

12. The stabilizing jack of claim 6 further comprising a wear tab disposed between a surface of the base frame and an adjacent surface of the slide frame.

13. The stabilizing jack of claim 12, the wear tab attached to one of the base frame and the slide frame.

14. The stabilizing jack of claim 6, the locking pin and the corresponding aperture configured to limit translation of the slide frame with respect to the base frame in the first direction when the locking pin is engaged with the corresponding aperture.

15. The stabilizing jack of claim 6, the locking pin and the corresponding aperture configured to substantially preclude translation of the slide frame with respect to the base frame in the first direction when the locking pin is engaged with the corresponding aperture.

16. A stabilizing jack comprising:
a base frame securable to a vehicle;
a slide frame in translating engagement with the base frame, the slide frame translatable in a first direction with respect to the base frame and the slide frame translatable in a second direction with respect to the base frame;
a first leg having a first end in pivotal and translating engagement with the slide frame and a second end engageable with a mating surface;
a first brace having a first end in pivotal engagement with the base frame and a second end in pivotal engagement with the first leg intermediate the first end of the first leg and the second end of the first leg;
a second leg having a first end in pivotal and translating engagement with the slide frame and a second end engageable with a mating surface;
a second brace having a first end in pivotal engagement with the base frame and a second end in pivotal engagement with the second leg intermediate the first end of the second leg and the second end of the second leg; and
a locking pin connected to one of the base frame and the slide frame, the locking pin being selectively engageable and disengageable with a corresponding aperture defined by the other of the base frame and the slide frame in response to translation of the slide frame with respect to the base frame in the second direction.

17. The stabilizing jack of claim 16 further comprising:
a first trunnion connected between the first end of the first leg and the slide frame, the first trunnion in pivotal engagement with the first end of the first leg and the first trunnion in sliding engagement with the slide frame; and
a second trunnion connected between the first end of the second leg and the slide frame, the second trunnion in pivotal engagement with the first end of the second leg and the second trunnion in sliding engagement with the slide frame.

18. The stabilizing jack of claim 17 further comprising a drive screw having a first threaded section and a second threaded section, one of the first threaded section and the second threaded section comprising a right-handed thread and the other of the first threaded section and the second threaded section comprising a left-handed thread, the drive screw in rotational and substantially non-translational engagement with the slide frame, the first threaded section in threaded engagement with the first trunnion, and the second threaded section in threaded engagement with the second trunnion.

19. The stabilizing jack of claim 18, the locking pin and the corresponding aperture configured to limit translation of the slide frame with respect to the base frame in the first direction when the locking pin is engaged with the corresponding aperture.

20. The stabilizing jack of claim 18, the locking pin and the corresponding aperture configured to substantially preclude translation of the slide frame with respect to the base frame in the first direction when the locking pin is engaged with the corresponding aperture.

* * * * *